(12) United States Patent
Nakamura et al.

(10) Patent No.: US 6,204,895 B1
(45) Date of Patent: Mar. 20, 2001

(54) DISPLAY PANEL ASSOCIATED WITH LIGHT COLLECTING PLATE AND POSITION ADJUSTING METHOD USING MICROLENSES FOR THE DISPLAY PANEL

(75) Inventors: Hiroki Nakamura, Chigasaki; Yoshihiro Watanabe, Gyoda; Takafumi Nakamura, Fukaya, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/163,204

(22) Filed: Sep. 30, 1998

(30) Foreign Application Priority Data

Sep. 30, 1997 (JP) .................................................. 9-266959

(51) Int. Cl.$^7$ ............................. G02F 1/1335; G02F 1/13
(52) U.S. Cl. .................................. 349/5; 349/95; 349/187
(58) Field of Search .............................. 349/5, 7, 8, 95, 349/187

(56) References Cited

U.S. PATENT DOCUMENTS

| | | | |
|---|---|---|---|
| 5,161,042 | * | 11/1992 | Hamada ................................. 349/41 |
| 5,760,850 | * | 6/1998 | Nakanishi et al. ...................... 349/5 |
| 5,764,318 | * | 6/1998 | Kurematsu et al. ..................... 349/5 |
| 5,764,323 | * | 6/1998 | Fukuda ................................... 349/95 |
| 5,850,276 | * | 10/1998 | Ochi et al. ............................. 399/158 |
| 5,929,954 | * | 7/1999 | Omae et al. ............................ 349/95 |
| 6,023,313 | * | 2/2000 | Hazama .................................. 349/95 |

FOREIGN PATENT DOCUMENTS 4-305622 * 10/1992 (JP) .
6-82772 * 3/1994 (JP) .

* cited by examiner

Primary Examiner—Kenneth Parker
Assistant Examiner—Mike Qi

(57) ABSTRACT

A display panel is to be fixed to a light collecting plate having a plurality of lenses and includes a matrix array of pixel electrodes opposed to the lenses of the light collecting plate, a plurality of electrode wiring lines formed along rows and columns of the pixel electrodes, and a driver circuit formed outside a display area corresponding to the matrix array of the pixel electrodes, for driving the pixel electrodes via the electrode wirings. Particularly, in the display panel, a plurality of alignment marks for positional adjustment of aligning the focal spots of the lenses with the pixel electrodes are arranged to be opposed to the lenses and separated from the display area by a distance corresponding to an integer number of times of a pitch of the pixel electrodes in at least one of row and column directions of the pixel electrodes.

19 Claims, 8 Drawing Sheets

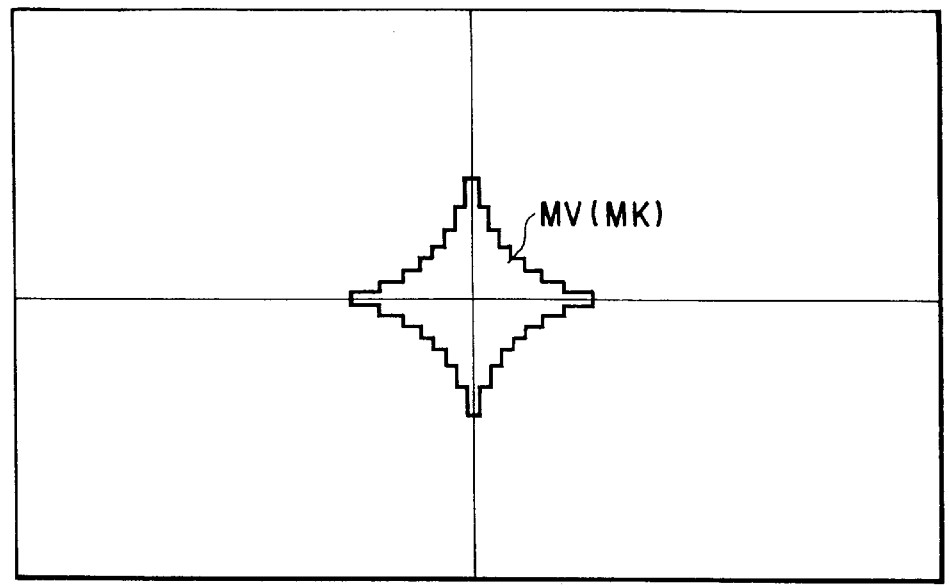
F I G. 11
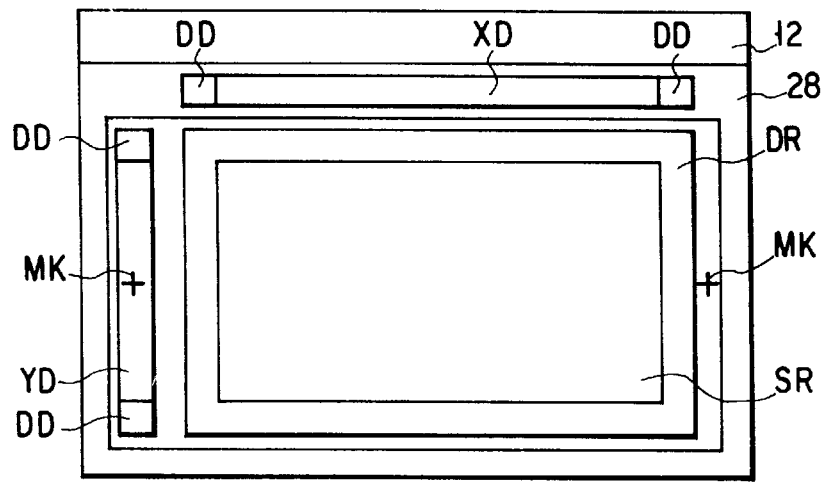
F I G. 12
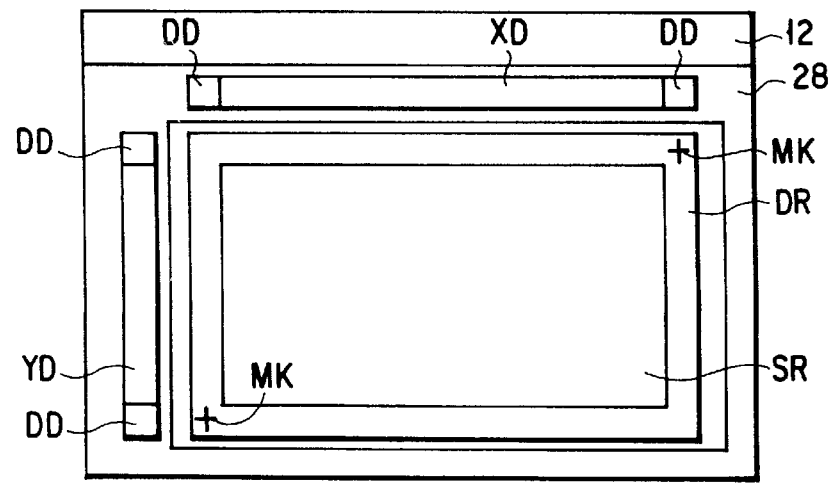
F I G. 13

DISPLAY PANEL ASSOCIATED WITH LIGHT COLLECTING PLATE AND POSITION ADJUSTING METHOD USING MICROLENSES FOR THE DISPLAY PANEL

BACKGROUND OF THE INVENTION

The present invention relates to a projection-type display device using a light collecting plate, and more specifically to a display panel associated with the light collecting plate in a predetermined positional relationship and a position adjusting method for the display panel.

Hitherto, many types of liquid crystal display panels have been proposed. The most commonly used type of liquid crystal display panel is one that has a layer of liquid crystal represented by twisted nematic liquid crystal. With this type of liquid crystal display panel, display is achieved by controlling the twist of liquid crystal molecular orientation to determine the optical rotatory power of light that passes through the liquid crystal layer. Stated in more detail, the operating principle consists in the control of light transmission to the image observed surface side of the liquid crystal display panel by employing the birefringence or optical rotatory power of light in the liquid crystal layer and the linear polarization characteristics of the polarizing plates.

The liquid crystal display panel has thin film transistors (hereinafter referred to as TFTS) each formed for the purpose of switching a voltage applied to the liquid crystal within an associated pixel. The TFTs made of amorphous silicon or polysilicon have been manufactured or are now under development. Among them, the polysilicon-based TFTs have advantages resulting from the mobility in polysilicon. That is, in the first place, since the polysilicon is high in mobility, the amount of charge that can be flowed into each TFT per unit time can be increased. Therefore, the TFT size can be reduced and, as a result, the pixel aperture ratio can be increased. Second, a circuitry of driving the switching TFTs can be formed on the same substrate using polysilicon. Accordingly, the necessity of driver ICs serving as the driving circuitry and the mounting step therefor is eliminated, reducing the manufacturing cost. Further, it is possible to reduce the width of the frame portion outside the display area, which will be required in a future liquid crystal display panel. Because of the aforementioned advantages, attention has been paid to the polysilicon-based TFTs as a key technology.

A liquid crystal display panel containing the driving circuitry formed of such polysilicon TFTs has been developed and manufactured as a display element for a video projector or a video camera monitor because it provides a small, high-definition display panel.

In order to attain high brightness, the video projector generally employs a three-panel scheme of displaying a color image with three liquid crystal display panels for red, green and blue (hereinafter referred to as R, G, and B, respectively) which are three primary colors of light. On the other hand, the video camera monitor employs a single-panel scheme of displaying a color image with a single liquid crystal display panel having a color filter. In addition, a low-brightness projector has been manufactured by diverting the single liquid crystal display panel for the video camera monitor to projection.

However, the liquid crystal display panel for the single-panel scheme requires three times as many pixels as that for the three-panel scheme. When the display panel for the single-panel scheme is formed in the same size as that for the three-panel scheme, the aperture ratio thereof is lowered due to the required number of pixels. In addition, there is loss of light due to the color filter. Therefore, it is difficult to implement a high-brightness projector. For this reason, the three-panel scheme is mainly employed in the conventional projector. However, it difficult to reduce the manufacturing cost since three display panels and an optical separation and collection system are required in the three-panel scheme.

In view of a reduction in the manufacturing cost, attention has been paid on new types of single-panel projectors. In particular, a single-panel projector that uses dichroic mirrors for performing deflection and color separation and a liquid crystal display panel having a microlens light collecting plate, and a single-panel projector that uses a liquid crystal display panel having a hologram optical element plate for performing color separation and light collection are being developed actively.

FIG. 14 schematically illustrates the operating principle of a liquid crystal projector that requires no color filter, and FIG. 15 illustrates the paths of light incident on a set of RGB pixels in the liquid crystal projector. As shown in FIG. 14, a microlens light collecting plate 102 is mounted on the light receiving surface of a liquid crystal display panel 104, which is composed of an array substrate 105 having TFTs formed thereon and a counter substrate 106 opposed to the array substrate. The light collecting plate 102 has an array of microlenses 102L each assigned to a corresponding set of RGB pixels on the liquid crystal display panel. By dichroic mirrors 103, white light emitted from a light source is separated into collimated color component rays 110, 111, and 112 of RGB and deflected to the light collecting plate 102 at different incident angles. Each microlens focuses the color component rays 110, 111, and 112 of RGB onto the apertures 107, 108, and 109 of corresponding RGB pixels in the liquid crystal display panel. Accordingly, the apertures 107, 108 and 109 of RGB pixels can receive the color component rays 110, 111, and 112, respectively. The color component rays 110, 111 and 112 are transmitted through the apertures 107, 108 and 109 and emitted therefrom as outgoing rays 115, 116 and 117. In this manner, color display can be performed without using a color filter. It thus follows that there is no loss of light due to the color filter. Therefore, the dimensions and the cost of the optical system can be reduced.

In the display device using such a microlens or hologram optical element plate, each microlens or hologram optical element must be precisely aligned with a corresponding set of color pixels of the liquid crystal display panel. To reduce loss of light, the precision of the alignment must be increased as the pixels of the liquid crystal display panel are downsized. This is particularly important to the above-described display device with no color filter. Conventionally, there is an attempt to adjust the positional relationship between the microlenses and the color pixels of the liquid crystal display panel by observing a moire pattern. However, in such a moire-based alignment method, it is difficult to secure the precision of alignment enough to cope with the downsizing of pixels. In addition, this method cannot determine the center of each microlens and which one of the color pixels opposes the center of the microlens. Accordingly, the method is not applicable to the above-described single-panel display device with no color filter.

BRIEF SUMMARY OF THE INVENTION

It is an object of the present invention to provide a display panel which can improve the precision in positional adjustment of aligning the focal spots of lenses of a light collecting plate with pixel electrodes thereof, and a position adjusting method for the display panel.

According to the present invention there is provided a display panel to be fixed to a light collecting plate having a plurality of lenses, the display panel comprising: a matrix array of pixel electrodes opposed to the lenses of the light collecting plate; a plurality of electrode wiring lines formed along rows and columns of the pixel electrodes; a driver circuit formed outside a display area corresponding to the matrix array of the pixel electrodes, for driving the pixel electrodes via the electrode wirings; and a plurality of alignment marks for positional adjustment of aligning the focal spots of the lenses with the pixel electrodes; wherein the alignment marks are arranged to be opposed to the lenses and separated from the display area by a distance corresponding to an integer number of times of a pitch of the pixel electrodes in at least one of row and column directions of the pixel electrodes.

According to the present invention there is provided a position adjusting method for a display panel to be fixed to a light collecting plate having a plurality of lenses, comprising steps of preparing the display panel which comprises: an array substrate including a matrix array of pixel electrodes opposed to the lenses of the light collecting plate, a plurality of electrode wiring lines formed along rows and columns of the pixel electrodes, and a driver circuit formed outside a display area corresponding to the matrix array of the pixel electrodes, for driving the pixel electrodes via the electrode wirings; a counter substrate which includes a counter electrode opposed to the matrix array of the pixel electrodes; a liquid crystal layer held between the array substrate and the counter substrate; and a plurality of alignment marks which is formed on one of the array substrate and the counter substrate from which light applied via the light collecting plate is output, arranged to be opposed to the lenses, and separated from the display area by a distance corresponding to an integer number of times of a pitch of the pixel electrodes in at least one of row and column directions of the pixel electrodes; and adjusting a positional relationship between the focal spots of the lenses and the alignment marks such that the focal spots of the lenses are aligned with the pixel electrodes.

With the display panel and the position adjusting method, since the alignment marks are opposed to the light collecting plate and separated from the display area by a distance corresponding to an integer amount of times of the pixel electrode pitch in at least one of row and column directions of the pixel electrodes, position adjustment of aligning the focal spots of the lenses of the light collecting plate with the pixel electrodes can be performed with accuracy. Further, no alignment mark is required on the light collection plate side.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 11 is a view showing an alignment mark made of a vernier pattern;

FIG. 12 is a view showing an example in which one of the alignment marks shown in FIG. 11 is formed in a scanning line driver circuit;

FIG. 13 is a view showing an example in which the alignment marks shown in FIG. 11 are formed on the both side of the display area in a diagonal direction of the light collecting plate;

DETAILED DESCRIPTION OF THE INVENTION

Figure 1:
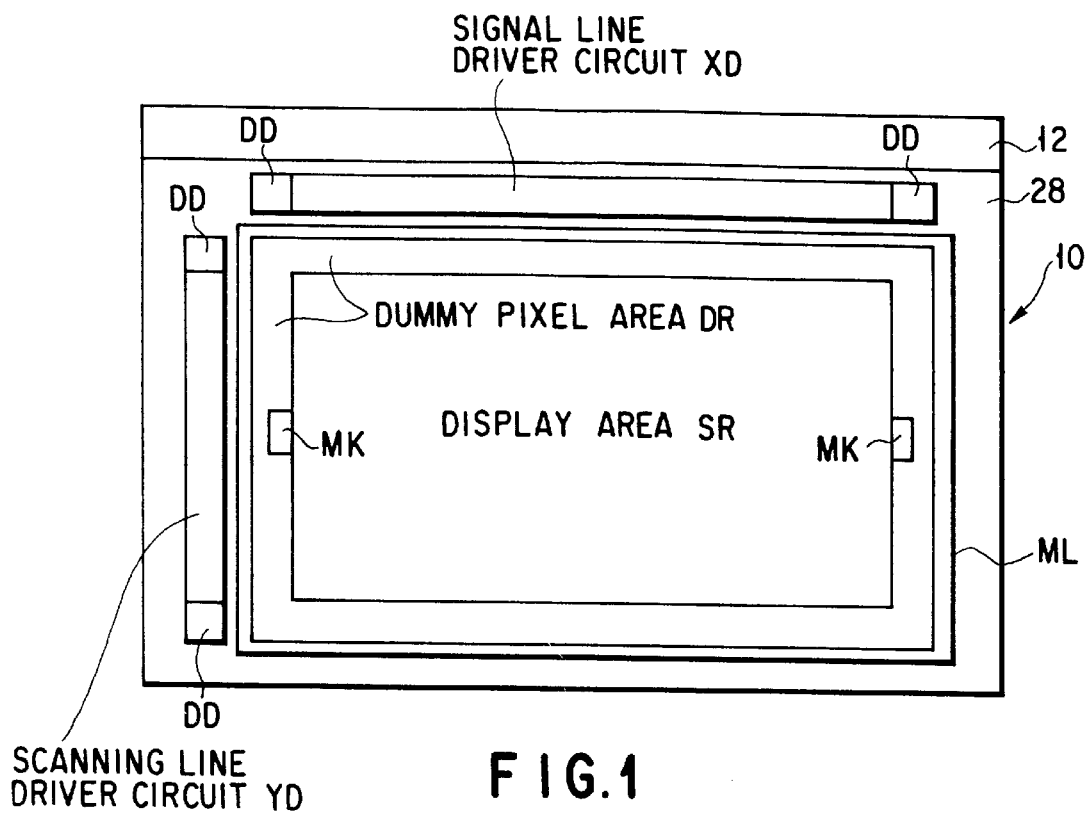
FIG. 1 is a plan view of a projection-type liquid crystal display panel according to an embodiment of the present invention.
Figure 2:
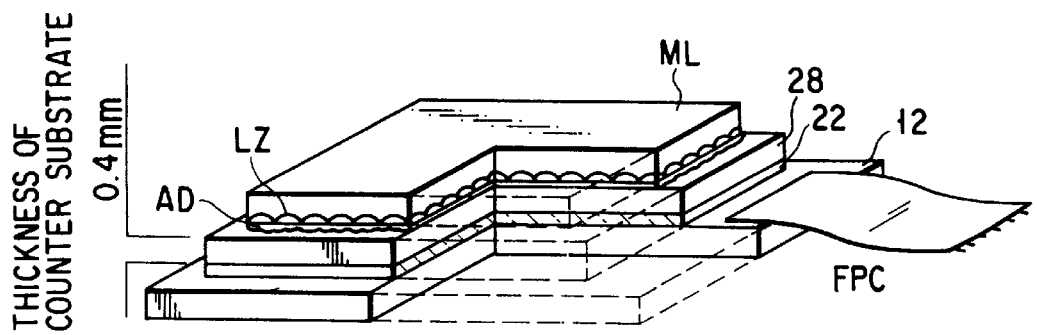
FIG. 2 is a perspective view, with portions broken away, of the liquid crystal display panel shown in FIG. 1.
Figure 3:
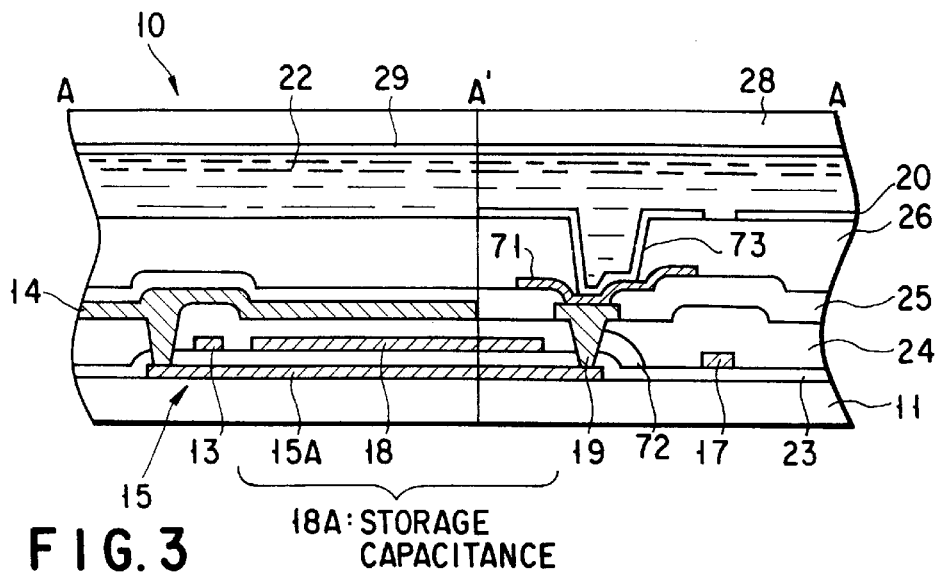
FIG. 3 is a sectional view of the liquid crystal display panel shown in FIGS. 1 and 2.
Figure 4:
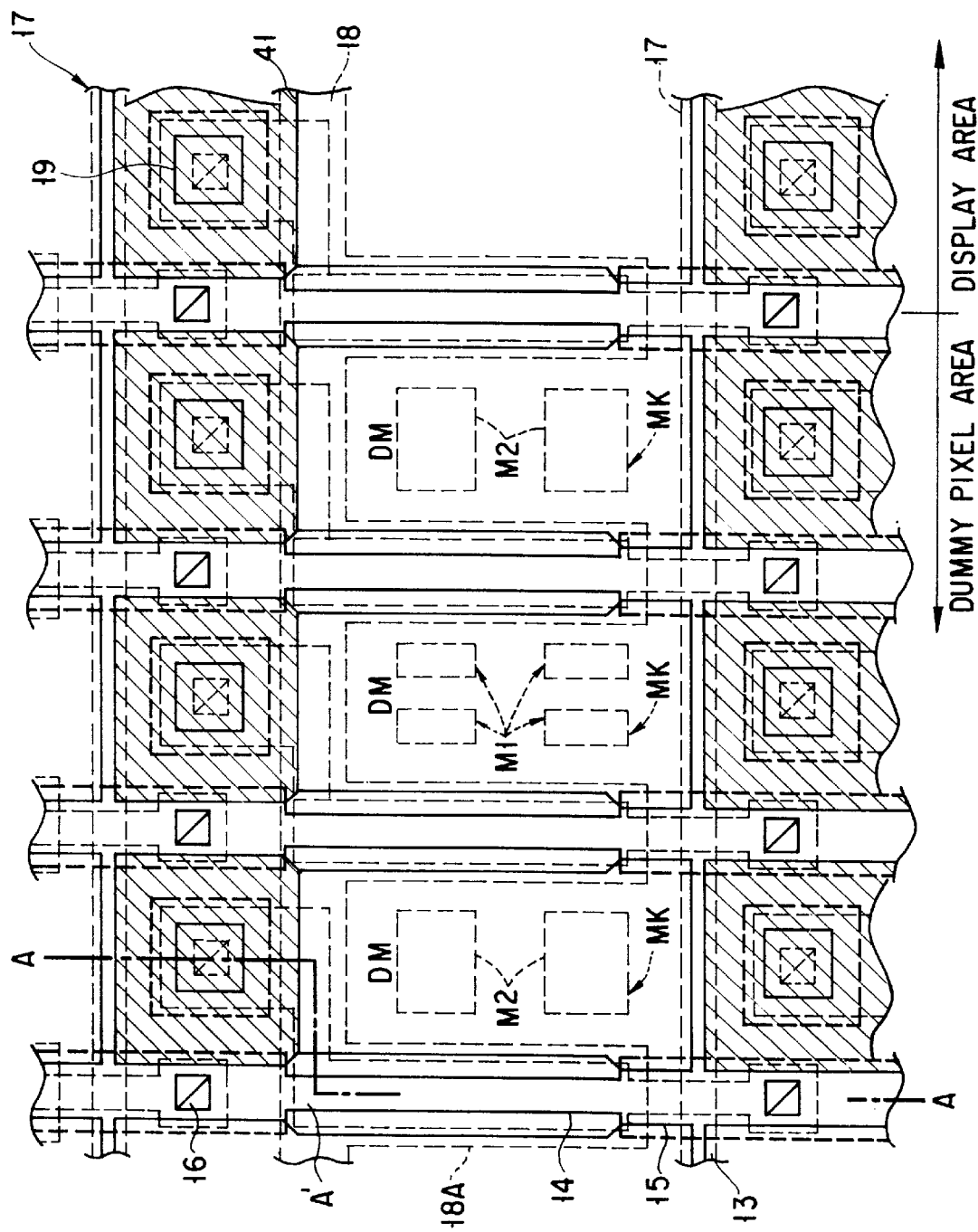
FIG. 4 is a view showing a dummy pixel area in the liquid crystal display panel shown in FIG. 1.

A projection-type liquid crystal display panel according to an embodiment of the present invention will be described with reference to FIGS. 1 to 4. FIG. 1 shows a plan structure of the liquid crystal display panel. FIG. 2 shows an outer appearance of the liquid crystal display panel. FIG. 3 shows a sectional structure of the liquid crystal display panel. FIG. 4 shows a detailed structure in a dummy pixel area of the liquid crystal display panel. The liquid crystal display panel 10 has an array substrate 12, a counter substrate 28, a liquid crystal layer 22, and a light collecting plate ML. The array substrate 12 has a matrix array of transparent pixel electrodes 20, a plurality of scanning lines 17 formed along the rows of pixel electrodes 20, a plurality of signal lines 14 formed along the columns of pixel electrodes 20, a scanning line driver circuit YD which is formed outside a display area SR in which the pixel electrodes 20 are arrayed in the matrix form at a predetermined pitch and sequentially drives the scanning lines 17, and a signal line driver circuit XD which is formed outside the display area SR and drives the signal lines 14. Further, a plurality of polysilicon thin film transistors (hereinafter referred to as polysilicon TFTs) 15 are formed near intersections of the scanning lines 17 and the signal lines 14 and assigned to the pixel electrodes 20. Each of the TFTs serves as a switching element which is driven by a corresponding scanning line 17 to apply a video signal voltage from a corresponding signal line 14 to a corresponding pixel electrode 20.

A dummy pixel area DR is located between the display area SR and each of the scanning line driver circuit YD and the signal line driver circuit XD. In the dummy pixel area DR, a plurality of transparent dummy pixel electrodes DM are arrayed at the predetermined pitch to be successive to the pixel electrodes 20 in the display area SR. A dummy polysilicon TFT, a dummy signal line and a dummy scanning line are further provided for each dummy pixel electrode DM in order to obtain the same circuit arrangement as that in the display area SR. In the scanning line driver circuit YD and the signal line driver circuit XD, there are provided dummy driver sections DD to drive the dummy scanning and signal lines.

The array substrate 12 further includes a plurality of alignment marks MK in the dummy pixel area DR. The alignment marks MK are placed on both sides of the display area SR along at least one of the central row and the central column of pixel electrodes 20.

The counter substrate 28 has a counter electrode opposed to the matrix array of pixel electrodes 20 on the array substrate. The liquid crystal layer 22 is held between the array substrate 12 and the counter substrate 28. The light collecting plate ML has a plurality of microlenses LZ each of which is allocated to a set of three pixel electrodes 20 for primary colors (R, G, B). The light collecting plate ML is fixed to the counter substrate 28 at a position where each of the microlenses LZ is opposed to a corresponding set of pixel electrodes 20.

Here, the liquid crystal display panel 10 will be further described in conjunction with the manufacturing process therefor. A semiconductor layer 15 of the polysilicon TFT 15 is formed by depositing an amorphous silicon film of about 500 angstroms in thickness over a glass plate 11 by means of plasma CVD (PECVD), subjecting it to a dehydrogenation process, crystallizing it to polycrystalline silicon using laser annealing, and patterning the resultant polysilicon film to an island form. Subsequently, the semiconductor layer 15A is covered with a gate insulating film 23 deposited at a thickness of about 1000 angstroms, the gate insulating film 23 is covered with a layer of molybdenum-tungsten alloy (MoW) deposited at a thickness of 4000 angstroms, and the molybdenum-tungsten alloy layer is patterned to form the gate electrodes 13 and the scanning lines 17 integrated with the gate electrodes 13. At this time, storage capacitance lines 18 are also formed substantially in parallel with the scanning lines 17. Impurities are introduced into the semiconductor layer 15A with the gate electrode 13 used as a mask in a self-alignment process. Subsequently, a first interlayer insulating film 24 is formed by depositing silicon oxide at a thickness of about 5000 angstroms. The first interlayer insulating film 24 and the gate insulating film 23 are patterned to form source and drain holes 72. Next, the signal lines 14 and drain electrodes 19 are formed in a multilayered structure of Mo/Al/Mo having a thickness of 6000 angstroms. Although the pixel switching TFTs 15 are formed of n-channel transistors, the driver circuits YD and XD are formed in a CMOS structure of n-channel and p-channel transistors. Thus, an impurity doping process required for forming source and drain regions is performed separately for each of n-channel and p-channel transistors in the driver circuits YD and XD. Note here that the pixel switching TFT 15 has an LDD (lightly doped drain) structure in which an $n^-$-type region is formed between the channel region and each of the source and drain regions.

Thereafter, a second interlayer insulating film 25 is formed by depositing silicon nitride at a thickness of about 5000 angstroms. A light-shielding layer 71 made of metal such as Mo or the like is formed on the second interlayer insulating film 25 in the vicinity of each contact hole 72 in the display area SR and the dummy pixel area DR. The area that correspond to each alignment mark MK is not covered with the light-shielding layer 71. Subsequently, a third interlayer insulating film 26 is formed by depositing acrylic resin at a thickness of about 2 $\mu$m, thereby smoothing irregularities of the display area and its peripheral area. The thickness of the third interlayer insulating film 26 should preferably be within a range of 1 to 6 $\mu$m. The pixel electrode 20 is formed after formation of a contact hole extending through the second and third interlayer insulating layers 25 and 26. The interlayer insulating film 26 may be made of an organic material other than acrylic resin or an inorganic material such as SOG (Spin On Glass), provided that it can achieve the smoothing effectively. The interlayer insulating layer 26 may be a composite layer formed of an organic material layer and an inorganic material layer stuck thereon. The organic material, if it has photosensitivity, allows the manufacturing steps to be reduced, but it does not have to be photosensitive.

When the array substrate 12 is thus formed, an alignment film (not shown) made of, for example, polyimide is formed to entirely cover the main surface of the array substrate including the dummy pixel area DR, and then subjected to an alignment treatment. For the counter substrate 28 as well, a similar alignment film is formed to entirely cover the counter electrode and then subjected to an alignment treatment. The counter electrode spreads over the dummy pixel area DR in addition to the display area SR. With their alignment films opposed to each other, the array substrate 12 and the counter substrate 28 are stuck together with sealant applied along the periphery of the dummy pixel area. The sealant is then thermally hardened. The liquid crystal layer 22 is formed by filling liquid crystal into the space between the substrates through an inlet provided in a portion of the sealant using the well-known reduced pressure injection method or suction injection method and then sealing the inlet. It is recommended that the thickness of the counter substrate 28, which depends on the pixel size, be set to about 0.4 mm for a pixel size of 27 $\mu$m×81 $\mu$m by way of example.

When the liquid crystal display panel 10 is obtained in the manner described above, an ultraviolet setting adhesive AD, for example, is applied to the top of the counter substrate 28, and the light collecting plate ML is then placed on the counter substrate 28 under pressure with that adhesive therebetween. Thereby, the thickness of the adhesive AD is set to a fixed value of the order of 10 to 30 $\mu$m, so that the light collecting plate ML can be separated from the array substrate 12 by a focal distance of the microlenses to obtain a spot light of a predetermined diameter on the array substrate 12.

Figure 6:
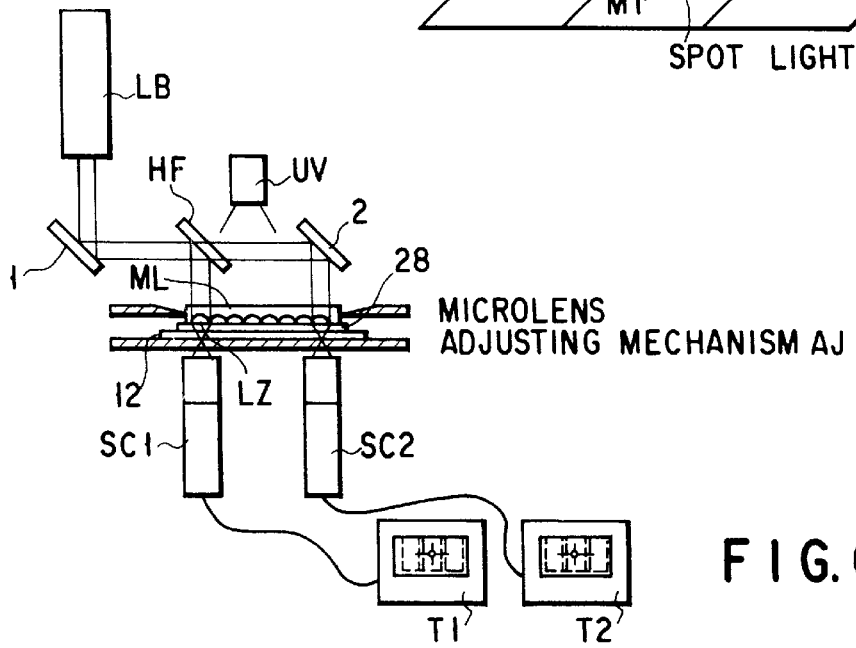
FIG. 6 is a view showing equipment used for positional adjustment and fixing of a light collecting plate shown in FIGS. 1 and 2.

Subsequently, the light collecting plate ML is subjected to positional adjustment using a microlens adjusting mechanism shown FIG. 6, and then fixed to the counter substrate 28 by hardening the adhesive AD with ultraviolet rays emitted from an ultraviolet source UV disposed on the light collecting plate ML side. With the microlens adjusting mechanism, laser light emitted from a laser source LB is first reflected by a total reflection mirror 1 and then reflected by a half mirror HF and a total reflection mirror 1 to the light collecting plate ML. The microlenses of the light collecting plate ML focus the incoming laser light as light spots on the array substrate 12.

Figure 5:
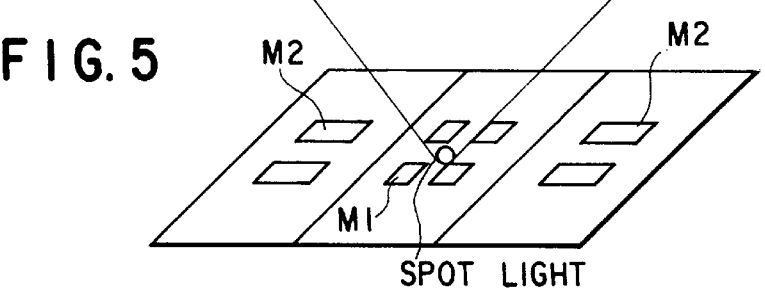
FIG. 5 is a view showing laser light applied to a microlens and focused on an alignment mark shown in FIG. 4.

The positional adjustment of the light collecting plate ML is performed with reference to alignment marks MK shown in FIGS. 4 and 5. Each alignment mark MK is made of the same material, for example, as the scanning line 17 and the storage capacitance line 18 that define the pixel aperture, and has three mark patterns located at positions of respective ones of the dummy pixel electrodes DM which are arrayed for three primary colors in the dummy pixel area DR. The central mark pattern M1 is different in shape from the mark patterns M2 on both sides of the mark pattern M1. This is intended that the mark pattern M1 which is placed according to the color pixel pitch to oppose the center of a microlens LZ can be distinguished from the other mark patterns M2.

Figure 8:
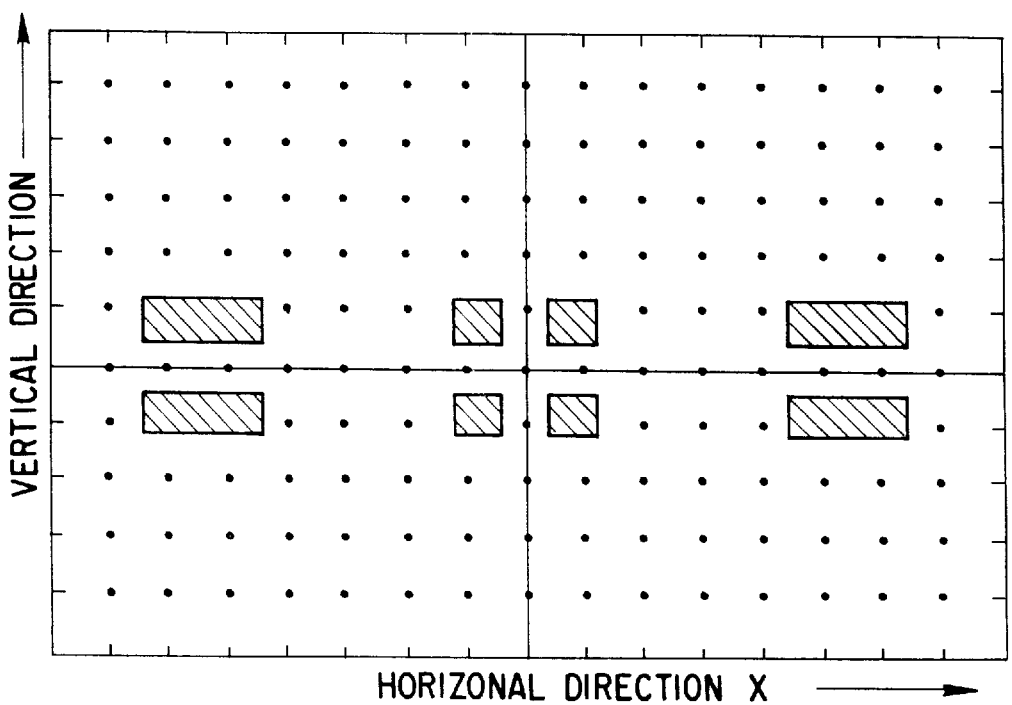
FIG. 8 is a view showing an image of alignment marks displayed together with a scale on a monitor shown in FIG. 6.

The positional adjustment is actually performed in such a manner that each of paired laser beams incident in the predetermined direction on the light collecting plate ML is focused by the microlens LZ onto the center of the mark pattern M1 that is laterally symmetric. The positional relationship between the mark patterns M1 and M2 and spots of the laser beams are observed using microscopes SC1 and SC2 having CCD cameras and disposed on the opposite side of the light collecting plate from the optical system including the laser light source, and monitors T1 and T2 attached to the CCD cameras. In FIG. 5, only the alignment marks in the dummy pixel area are shown as images. As shown in FIG. 8, each of the monitors T1 and T2 displays, together with a scale, the laser beam spot and the mark patterns M1 and M2 of the alignment mark MK as shown in FIG. 5. Thus, a deviation between the laser beam spot and the center of the mark pattern M1 is determined from the scale of the monitor. To eliminate the deviation, the light collecting plate ML is moved in the horizontal direction X or the vertical direction Y, or rotated by the microlens adjusting mechanism.

By making the mark pattern M1 for a color pixel that faces the lens center different in shape from the mark patterns M2 for the other color pixels, the position of the focal spot of each microlens LZ can be accurately aligned with a corresponding pixel electrode without making an error in the order of color pixels. Otherwise, even if the positional relationship between the light collecting plate ML and the array substrate is fixed, the colors of incoming light rays would not be assigned to the associated color pixels. It is desirable that a plurality of mark patterns be provided to cope with a slight deviation in the vertical and horizontal directions.

The laser light source is very effective in determining accurately deviations in the horizontal direction X and the vertical direction Y. In a case where the laser light source is used for positional adjustment, it is possible to avoid influences caused due to the physical position of an aperture and the difference in light intensity inside the lamp mirror when a conventional lamp is used as the light source. Therefore, the light collecting plate ML can be more accurately aligned with the array substrate 12.

At the same time, the highly collimated laser light provides a very sharp optical image. Even if variation exists between the focal lengths of the microlenses LZ, a high accuracy of alignment can be maintained.

Although, in the embodiment, the mark pattern M1 for a color pixel that faces the lens center is made different in shape from the other mark patterns M2, a plurality of mark patterns can be provided for the color pixel that faces the lens center.

Although, in the embodiment, the alignment marks MK are disposed symmetrically in the dummy pixel area DR on the right and left sides of the display area SR, they may be provided symmetrically on the top and bottom sides of the display area. Here, the accuracy of alignment of the microlenses LZ with the array substrate is, of course, important in the horizontal and vertical directions, but the alignment in the direction of rotation is more important from the standpoint of color nonuniformity. Such alignment accuracy in the direction of rotation can be improved by providing the alignment marks on the right and left sides or the top and bottom sides as described above. In particular, with the moire method, the accuracy is reduced when the moire pattern is not sharp. However, the accuracy not only in the horizontal and vertical directions but also in the direction of rotation is improved by aligning spots of laser beams applied from the light collecting plate side with the centers of the mark patterns. Therefore, the smaller the pixel size, the more the accuracy increases. From the standpoint of accurate alignment, it is desirable that the alignment marks be made of the same material as that defining the pixel aperture.

Figure 7:
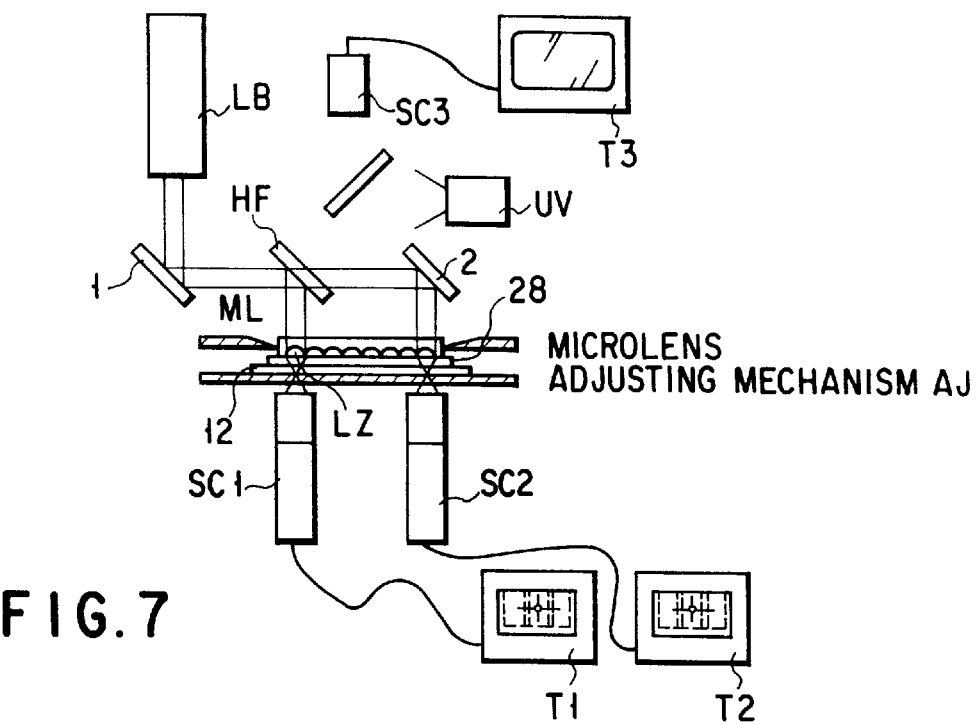
FIG. 7 is a view showing a modification of the equipment shown in FIG. 6.

Further, the laser-spot-based positional adjustment may be performed while observing moire images. In this case, the ultraviolet emitter UV is displaced from the position shown in FIG. 6 to the position shown in FIG. 7, a half mirror is placed in the position where the ultraviolet emitter UV was placed in FIG. 6, and the moire images are observed by using a microscope SC3 having a CCD camera arranged to captures the images through the half mirror and a monitor T3 attached to the microscope. The reason to observe the moire images is that deviations in the direction of rotation can be easily measured to perform a rough positional adjustment.

Although the embodiment has been described in terms of a specific example in which the alignment marks MK are formed in the dummy pixel area DR, they may be formed in any positions which are separated from the display area by a distance corresponding to an integer number of times of a pitch of the pixel electrodes in at least one of row and column directions of the pixel electrodes. However, if the alignment marks MK were formed in a space outer than the driver circuits XD and YD, the frame size of the liquid crystal display panel and the size of the light collecting plate ML would increase. This would result in an increase in cost. Further, if the alignment marks MK were extremely near the edges of the liquid crystal display panel, there would arise the problem that they become difficult to monitor. Although, in the embodiment, the light collecting plate ML is stuck on the counter substrate 28 after the formation of the liquid crystal layer 22, the microlenses LZ may be integrated with the counter substrate 28 in advance, and the liquid crystal layer 22 may be held between the array substrate 12 and the counter substrate 28 using ultraviolet setting sealant. In this case, only fixing of the counter substrate 28 using ultraviolet light and filling of liquid crystal are required after the position of the counter substrate 28 has been adjusted with reference to the alignment marks MK. When the thickness of the counter substrate 28 is allowed to be reduced upon a decrease in the pixel size, it is desirable to integrate the microlenses LZ with the counter substrate 28.

In the embodiment, since the alignment marks are formed in the dummy pixel area DR without being light-shielded, black display, for example, is effective to prevent the alignment marks from being observed.

Figure 9:
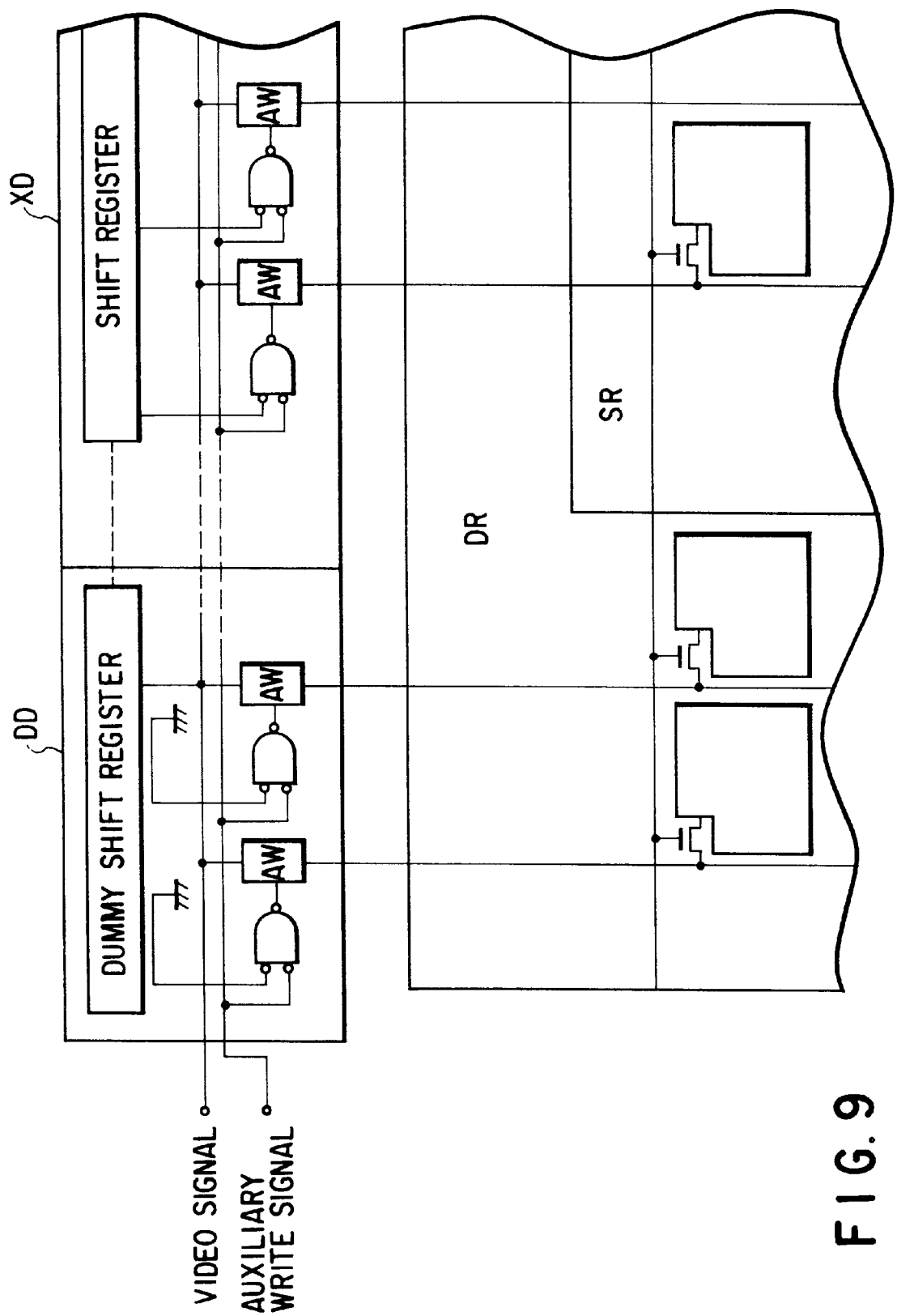
FIG. 9 is a view showing a structure of each switch circuit formed in a signal line driver circuit and a dummy driver section shown in FIG. 1 to sample a video signal to be supplied to a corresponding signal line.
Figure 10:
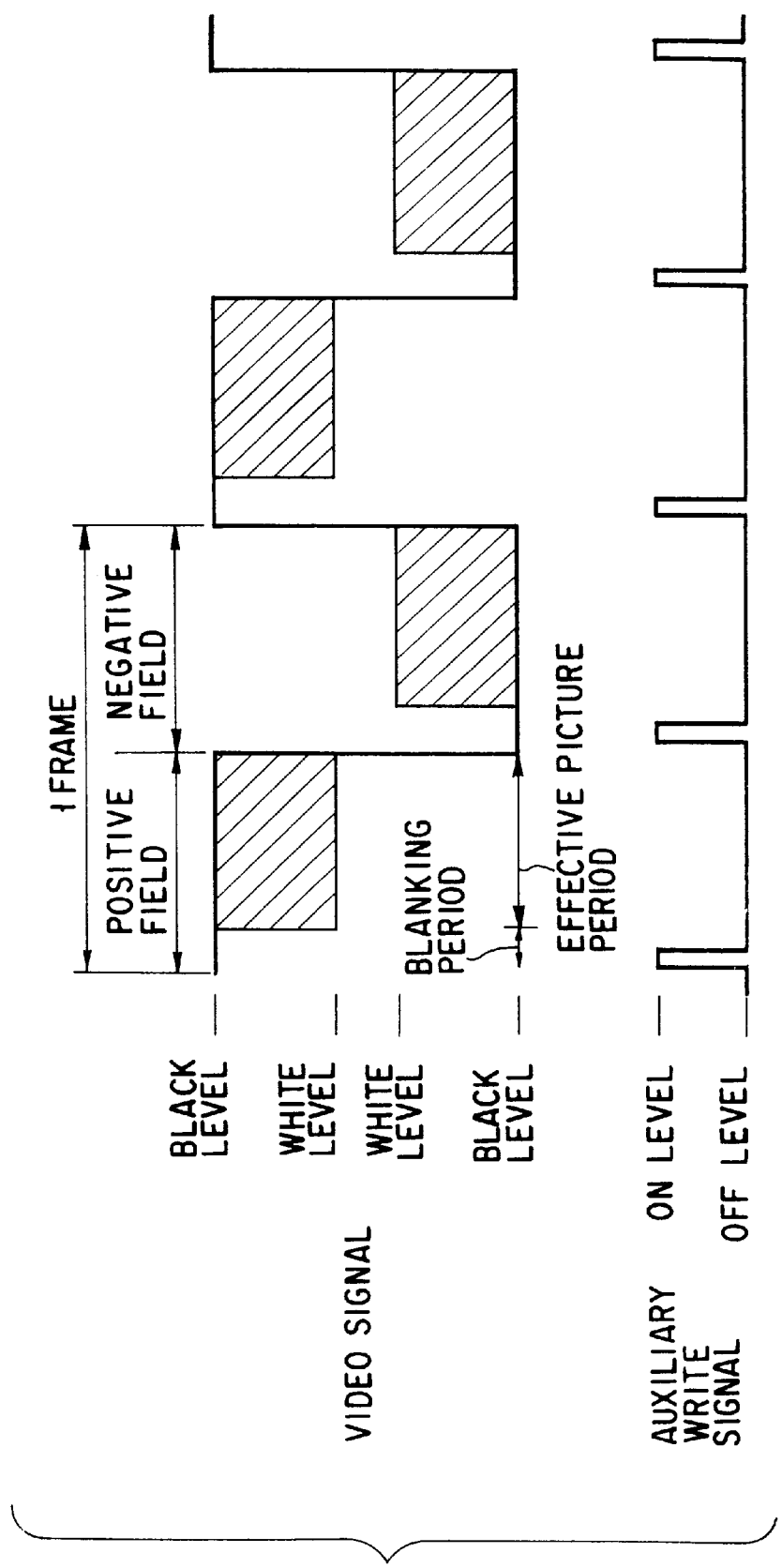
FIG. 10 is a view showing a waveform of a video signal to be sampled by the switch circuit shown in FIG. 9 and a waveform of an auxiliary write signal for controlling an operation of sampling the video signal.
Figure 14:
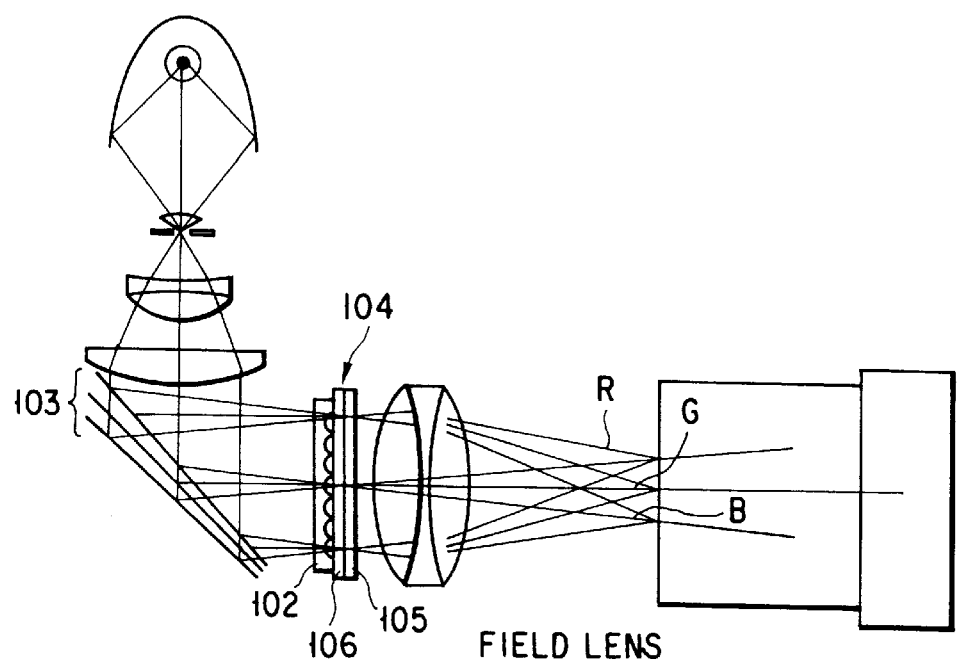
FIG. 14 is a schematic illustration of the operating principle of a general liquid crystal projector that requires no color filter.
Figure 15:
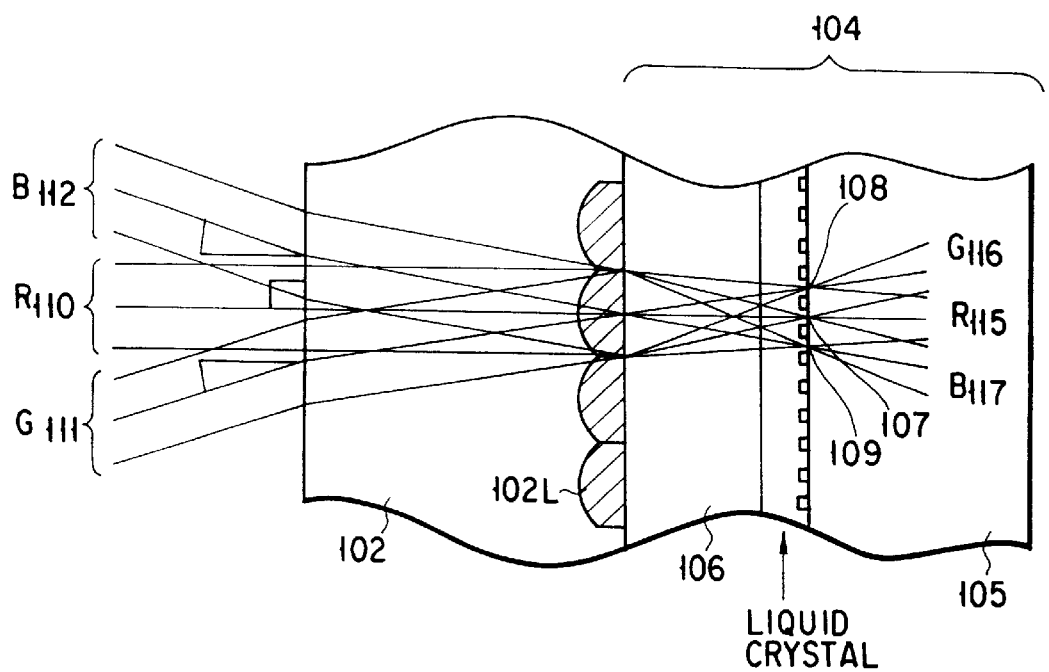
FIG. 15 is a view showing paths of light rays incident on a set of R, G and B pixels in the projector of FIG. 11.

The dummy driver sections DD and the signal line driver circuit XD are constructed to perform the black display as shown in FIG. 9, and controlled by an auxiliary write signal which is input in synchronism with a video signal as shown in FIG. 10.

In the signal line driver circuit XD, each of NAND circuits produces the logical sum of the auxiliary write signal and the output of a corresponding stage of a shift register and thereby controls a corresponding one of switch circuits AW disposed between a video signal transmission line and the signal lines. Whenever the auxiliary write signal is ON, each switch circuit AW is rendered conductive irrespective of the operation of the shift register, so that a voltage on the video signal transmission line is applied to the signal lines.

The dummy driver section DD also has the aforementioned arrangement except that a ground signal is applied to its NAND circuits instead of outputs of its dummy shift register. Each of the NAND circuits in the dummy driver section DD produces the logical sum of the auxiliary write signal and the ground signal to thereby control the operation of a corresponding one of switch circuits AW disposed between the video signal transmission line and the dummy signal lines. In this case, each switch circuit AW applies a voltage on the video signal transmission line to a corresponding one of the signal lines in the dummy pixel area when the auxiliary write signal is ON.

The auxiliary write signal is rendered ON during a blanking period in which the video signal is set at a black level. At this time, each of the switch circuits AW in the dummy driver section DD applies a video signal at the black level to a corresponding one of the signal lines. The black-level signal is applied to all the dummy pixels associated with the alignment marks through the TFTs to allow the dummy pixels to be placed in the black display state during the effective picture period. Thus, the alignment marks can be made invisible on the projection screen.

The apertures of the dummy pixels other than the dummy pixels associated with the alignment marks may be covered with light-shielding members. The light-shielding members are not required when the dummy pixels are set at the black level as described above.

In the embodiment, the mark patterns M1 and M2 are used as the alignment mark MK. Instead, a single vernier pattern MV shown in FIG. 11 may be used as each of alignment marks MK. In this case, a positional deviation of the laser spot can be measured with reference to the steps forming the periphery of the vernier pattern MV. When the vernier pattern MV is used as each of the alignment marks MK, it may be formed outside the dummy pixel area DR as shown in FIG. 12. In FIG. 12, one alignment mark MK is formed in the scanning line driver circuit YD, and the other alignment mark MK is formed in an area adjacent to the dummy pixel area DR. In this case, the each of the alignment marks MK is separated from the display area SR by a distance corresponding to an integer number of times of the pixel electrode pitch in the row direction of the pixel electrodes, and the light collecting plate ML is extended from the dummy pixel area DR to face the alignment marks MK. Further, when a collimated light source is used, two alignment marks MK each formed of the vernier pattern MV may be arranged on the both sides of the display area SR in the orthogonal direction of the light collecting plate ML. In this case, each of the alignment marks MK is separated from the display area SR by a distance corresponding to an integer number of times of the pixel electrode pitch in the row and column directions of the pixel electrodes.

Further, additional alignment marks may be formed on the light collecting plate ML. The formation number and range of alignment marks MK can be reduced by additionally performing positional adjustment of aligning the additional alignment marks MK with the alignment marks formed on the array substrate or the counter substrate.

In the embodiment, each of the microlens is assigned to three pixels. Instead, each of the microlens may be assigned to one pixel.

Further, in the embodiment, the liquid crystal display panel has a normally white display structure. Instead, this structure may by replaced by a normally black display structure. In this case, each dummy pixel can perform black display by a voltage applied during the blanking period and substantially equal to the counter electrode voltage.

According to the present invention, since the alignment marks are arranged in at least one of the row and column directions of the pixel electrodes and separated from the display area SR by a distance corresponding to an integer number of times of the pixel electrode pitch, the display panel can be reduced in size and the positional adjustment of the microlenses can be performed with accuracy.

In a case where the alignment marks are placed on both sides of the display area along at least one of the central row and the central column of pixel electrodes, the accuracy of positional adjustment in the direction of rotation can be improved and the occurrence of color nonuniformity within the display area is suppressed.

Moreover, in a case where each alignment mark is composed of three mark patterns formed at the positions of the respective three dummy pixel electrodes for three primary colors arranged in the dummy pixel area and, of those three mark patterns, the central one is made different in shape from the other two, the center of each microlens can be aligned with a corresponding color pixel on the array substrate.

Furthermore, since each alignment mark is formed of the same material as the electrode line that mainly defines the pixel aperture, the misalignment of the mark at the time of formation thereof can be reduced. In addition, since all the dummy pixels for the alignment marks can be maintained in the black display state by the auxiliary write signal, the alignment marks that disturb the image display can be made invisible on the display screen.

In the embodiment, the main mark pattern M1 of the alignment mark MK is assigned to the central one of the dummy RGB pixels. This main mark pattern M1 may be assigned to another one of the dummy RGB pixels in the case where the incident angle of the laser beam to the light collecting plate ML is changed to a predetermined angle other than the right angle.

Further, the alignment mark Mk may be constituted by part of a layer formed to serve as the signal lines, the scanning lines, the light-shielding members, or the like.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A display panel to be fixed to a light collecting plate having a plurality of lenses, comprising:

a matrix array of pixel electrodes opposed to the lenses of the light collecting plate;

a plurality of electrode wiring lines formed along rows and columns of the pixel electrodes;

a driver circuit formed outside a display area corresponding to the matrix array of the pixel electrodes, for driving the pixel electrodes via the electrode wirings; and a plurality of alignment marks for positional adjustment of aligning the focal spots of the lenses with the pixel electrodes;

wherein the alignment marks are arranged to be opposed to the lenses and separated from the display area by a distance corresponding to an integer number of times of a pitch of the pixel electrodes in at least one of row and column directions of the pixel electrodes.

2. A display panel according to claim 1, wherein the alignment marks are placed on both sides of the display area along at least one of the central row and central column of the pixel electrodes.

3. A display panel according to claim 1, wherein each of the alignment marks is formed in a dummy pixel area located between the driver circuit and the display area.

4. A display panel according to claim 3, wherein each of the alignment marks is assigned to one of dummy pixel electrodes for three primary colors arranged in the dummy pixel area.

5. A display panel according to claim 3, wherein each of the alignment marks is composed of three mark patterns which are formed at positions of the dummy pixel electrodes for three primary colors arranged in the dummy pixel area, and one of the three mark patterns is different in shape from the other two.

6. A display panel according to claim 1, wherein each of the alignment marks is made of the same material as the electrode wiring lines.

7. A display panel according to claim 3, wherein the dummy pixel area is covered with a light-shielding member except for the dummy pixel electrodes.

8. A display panel according to claim 3, further comprising a dummy driver circuit for driving dummy pixel electrodes arranged in the dummy pixel area.

9. A display panel according to claim 8, wherein the dummy driver circuit is arranged to apply a black display voltage to the dummy pixel electrodes.

10. A display panel according to claim 9, wherein the pixel wiring lines include scanning lines formed along rows of the pixel electrodes and the dummy pixel electrodes and signal lines formed along columns of the pixel electrodes and the dummy pixel electrodes, the pixel electrodes and the dummy pixel electrodes are connected to a plurality of switching elements each of which outputs a voltage on a corresponding signal line in response to a selection signal from a corresponding scanning line, and the dummy driver circuit is connected to ones of the signal lines that correspond to dummy pixel electrodes associated with the alignment marks to apply the black display voltage to these dummy electrodes.

11. A display panel according to claim 10, wherein the dummy driver circuit includes a control unit for applying the black display voltage to the dummy pixel electrodes associated with the alignment marks during a blanking period of a video signal applied for the pixel electrodes.

12. A display panel according to claim 1, further comprising:

an array substrate having the pixel electrodes, the electrode wiring lines, and the driver circuit;

a counter substrate having a counter electrode opposed to the pixel electrodes; and a liquid crystal layer held between the array substrate and the counter substrate;

wherein the alignment marks are formed on one of the array substrate and the counter substrate which is located on a side opposite to the light collecting plate to emit light incident from the light collecting plate.

13. A position adjusting method for a display panel to be fixed to a light collecting plate having a plurality of lenses, comprising steps of:

preparing the display panel which comprises an array substrate including a matrix array of pixel electrodes opposed to the lenses of the light collecting plate, a plurality of electrode wiring lines formed along rows and columns of the pixel electrodes, and a driver circuit formed outside a display area corresponding to the matrix array of the pixel electrodes, for driving the pixel electrodes via the electrode wirings; a counter substrate which includes a counter electrode opposed to the matrix array of the pixel electrodes; a liquid crystal layer held between the array substrate and the counter substrate; and a plurality of alignment marks which is formed on one of the array substrate and the counter substrate from which light applied via the light collecting plate is output, arranged to be opposed to the lenses, and separated from the display area by a distance corresponding to an integer number of times of a pitch of the pixel electrodes in at least one of row and column directions of the pixel electrodes; and adjusting a positional relationship between the focal spots of the lenses and the alignment marks such that the focal spots of the lenses are aligned with the pixel electrodes.

14. A position adjusting method according to claim 13, wherein the adjustment is made by directing laser light from a laser light source onto the array substrate through the light collecting plate, determining a deviation of a spot of laser light focused by one of the microlenses of the light collecting plate from the center of an alignment mark assigned to the one microlens, and collecting the position of the light collecting plate to eliminate the deviation.

15. A position adjusting method according to claim 14, the determination of the deviation is made through the use of a monitor that displays, together with a scale, the spot of laser light and the alignment mark which are observed on the opposite side of the array substrate from the laser light source.

16. A position adjusting method according to claim 15, wherein each of the alignment marks is composed of three mark patterns which are formed at positions of the dummy pixel electrodes for three primary colors arranged in the dummy pixel area, and one of the three mark patterns is different in shape from the other two.

17. A display panel according to claim 1, wherein each of the alignment marks is made of a vernier pattern.

18. A display panel according to claim 1, wherein one of the alignment marks is disposed in the driver circuit and opposed to the light collecting plate.

19. A display panel according to claim 1, wherein the alignment marks are disposed on both sides of the display area in an orthogonal direction of the light collecting plate.

* * * * *